(12) United States Patent
Longobardi et al.

(10) Patent No.: US 8,284,418 B2
(45) Date of Patent: Oct. 9, 2012

(54) DOCUMENT INFORMATION ACQUISITION AND NOTIFICATION OF DUPLICATE DOCUMENT STORAGE

(75) Inventors: Giuseppe Longobardi, Castellammare di Stabia (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 12/348,449

(22) Filed: Jan. 5, 2009

(65) Prior Publication Data

US 2010/0171993 A1 Jul. 8, 2010

(51) Int. Cl.
*G06K 15/00* (2006.01)
*G06F 3/12* (2006.01)

(52) U.S. Cl. .................... 358/1.14; 358/1.16

(58) Field of Classification Search ............ 358/1.1, 358/1.9, 1.13, 1.14, 1.15, 1.16, 1.17, 1.18, 358/3.28, 426.05, 426.06, 443; 709/202; 707/626, 633, 634, 667, 668, 723, 736, 758
See application file for complete search history.

(56) References Cited

U.S. PATENT DOCUMENTS

| | | | |
|---|---|---|---|
| 5,287,414 A | 2/1994 | Foster | |
| 5,893,908 A | 4/1999 | Cullen et al. | |
| 5,978,477 A | 11/1999 | Hull et al. | |
| 6,167,398 A | 12/2000 | Wyard et al. | |
| 6,199,073 B1 | 3/2001 | Peairs et al. | |
| 6,263,121 B1 * | 7/2001 | Melen et al. | 382/305 |
| 6,564,225 B1 | 5/2003 | Brogliatti et al. | |
| 6,618,727 B1 | 9/2003 | Wheeler et al. | |
| 6,665,086 B2 | 12/2003 | Hull et al. | |
| 6,704,118 B1 | 3/2004 | Hull et al. | |
| 6,735,604 B2 * | 5/2004 | Miller et al. | 707/600 |
| 6,738,759 B1 | 5/2004 | Wheeler et al. | |
| 7,301,470 B2 | 11/2007 | Stanfield et al. | |
| 7,366,718 B1 * | 4/2008 | Pugh et al. | 1/1 |
| 2008/0065630 A1 * | 3/2008 | Luo et al. | 707/6 |

* cited by examiner

*Primary Examiner* — Gabriel Garcia
(74) *Attorney, Agent, or Firm* — Stephen J. Walder, Jr.; Jeffrey S. LaBaw

(57) ABSTRACT

Mechanisms for document information acquisition and notification of duplicate document storage are provided. The mechanisms convert a physical hard copy document to an electronic form of the document and generates a first digital fingerprint of the electronic form of the document. The mechanisms further retrieve one or more second digital fingerprints for previously stored electronic forms of documents. The first digital fingerprint is compared to the one or more second digital fingerprints. Storage of the electronic form of the document is controlled based on results of comparing the first digital fingerprint to the one or more second digital fingerprints.

18 Claims, 4 Drawing Sheets

DOCUMENT INFORMATION ACQUISITION AND NOTIFICATION OF DUPLICATE DOCUMENT STORAGE

BACKGROUND

The present application relates generally to an improved data processing apparatus and method and more specifically to mechanisms for acquiring document information and using the document information to determine if the document is being electronically stored as a duplicate and providing a notification of such.

Digital archiving of hard copy documents is being widely used. With the increased usage of computers, increased storage capacities of data storage systems and devices, and increased speeds of computing devices, such digital archiving is becoming more prevalent as organizations migrate from paper based organizations to paperless by converting physical hard copy documents to an electronic form. Typically, such physical hard copy documents are converted to electronic form by way of a scanning process using a scanner device or the like.

In large scale organizations, it may often be the case that the same documents may be archived several times in several different storage locations. Such situations are more prevalent in large scale organizations because individuals are less likely to interact with one another on document storage issues and the storage systems have many more storage locations where documents can potentially be stored resulting in less likelihood that a particular individual will know what documents are stored in each possible storage location of the storage system. While storage capacities are greatly increased, such duplicate storage of documents in archives represents a waste of resources that would be beneficial to avoid.

SUMMARY

In one illustrative embodiment, a method, in a data processing system, is provided for storing an electronic form of a physical hard copy document. The method comprises converting the physical hard copy document to an electronic form of the document and generating a first digital fingerprint of the electronic form of the document. The method further comprises retrieving one or more second digital fingerprints for previously stored electronic forms of documents and comparing the first digital fingerprint to the one or more second digital fingerprints. Moreover, the method comprises controlling storage of the electronic form of the document based on results of comparing the first digital fingerprint to the one or more second digital fingerprints.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
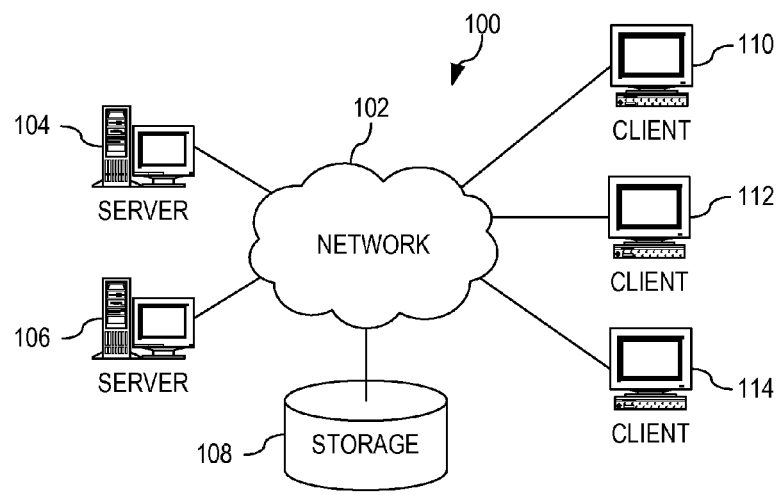
FIG. 1 is an example diagram of a distributed data processing system in which aspects of the illustrative embodiments may be implemented.

The illustrative embodiments provide a mechanism for detecting when the same document is being stored electronically repeatedly and providing a notification and user options when such a situation is detected. With the mechanisms of the illustrative embodiments, when a physical hard copy document is scanned using a scanning device, or otherwise converted to an electronic format, a digital fingerprint of the physical hard copy document is generated by storing data representative of predefined portions, i.e. control points, of the physical hard copy document. This digital fingerprint may be stored in a separate data structure, in metadata associated with the electronic file generated by the conversion of the physical hard copy document to electronic form, or otherwise associated with the electronic file corresponding to the physical hard copy document.

The digital fingerprint is compared with other digital fingerprints of physical hard copy documents that have been previously converted to electronic form. If there is a matching digital fingerprint for a previously converted document, then a notification may be output to the user via a data processing system associated with the scanning device. The notification may further include user selectable options for either continuing with the storing of the electronic file of the hard copy document or to store a link to the previously stored electronic file for the previously converted hard copy document in the location where the duplicate electronic file was going to be stored.

Such comparisons of digital fingerprints of documents may be performed regardless of the target storage location for the documents or the actual storage location of previously converted documents. The storage of a link to a previously converted document's electronic file rather than a duplicate of the electronic file in the new storage location greatly reduces the amount of storage space that electronic document files consume by eliminating duplicate electronic files. Moreover, the mechanisms may be integrated into newly emerging digital furniture devices which may or may not include shredding devices for shredding or otherwise eliminating the physical hard copy document.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
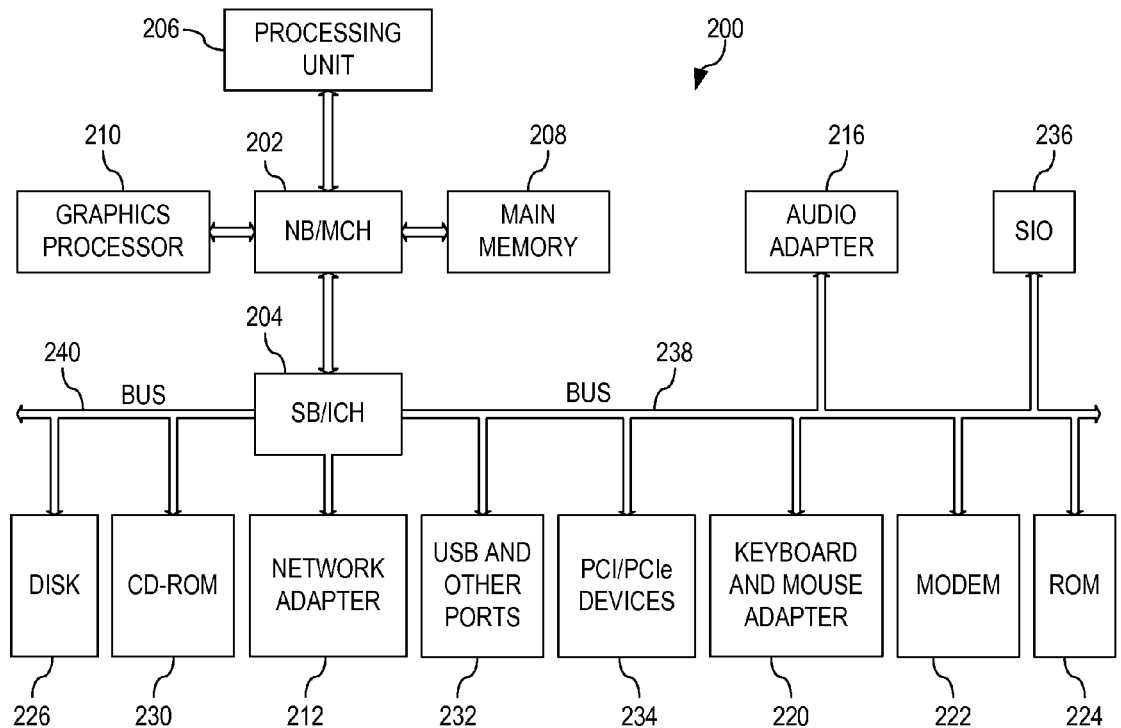
FIG. 2 is an example block diagram of a data processing device in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a distributed data processing system implementation, this is only an example and is not intended to state or imply any limitation with regard to the features of the present invention.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, with the illustrative embodiments, a user of a client computing device, such as client 110, may convert a physical hard copy document to an electronic form for archiving or storing as one or more electronic files. The physical hard copy document may be converted to an electronic form using a scanner device or the like. As is generally known, such scanner devices scan the physical hard copy document with an optical pickup device which then stores data representative of the color of the detected pixels as data values in one or more electronic files. Typically, a user may simply scan-in such a physical hard copy document and store it's electronic version, having one or more electronic data files, to a local or remotely coupled storage device without any concern for whether or not multiple copies of the same physical hard copy document are stored in the local or remotely located storage device, or storage devices of one or more storage systems associated with the storage device, to which the scanned-in document is being stored. However, with the mechanisms of the illustrative embodiments, the data of the electronic form of the document is analyzed to generate a fingerprint of the electronic form of the document which may then be used to determine if the same physical hard copy document has been previously stored in an electronic form in some location of the storage device or associated storage system(s). In this way, storage space may be maximized by avoiding duplicative storage of an electronic form of a same or similar physical hard copy document.

Either the client 110 associated with the scanner device used to convert the physical hard copy document into an electronic form, a server, e.g., server 104, or controller of a storage system, such as a storage system associated with storage unit 108, for example, may be provided with logic for implementing the mechanisms of the illustrative embodiments. These mechanisms may be implemented in hardware logic, software logic, or any combination of hardware and software logic. For purposes of this description, it will be assumed that the logic is implemented in software which is executed by one or more processors of a server computing device, such as server 104. This is only an example and is not intended to state or imply any limitation with regard to the possible implementations of the illustrative embodiments as will become readily apparent to those of ordinary skill in the art in view of this detailed description.

The data, e.g., electronic data file(s), of the electronic form of the physical hard copy document may be transmitted to the server 104 from the client 110 via the network 102. In response to receiving the data, the server 104 analyzes the data to generate a digital fingerprint of the electronic form of the physical hard copy document. Generating the digital fingerprint of the electronic form of the document, in one illustrative embodiment, involves analyzing the data values corresponding to predetermined portions of the physical hard copy document and utilizing these data values to generate a digital fingerprint representation of the electronic form of the document. For example, the predetermined portions may be pre-selected portions of the document upon which optical character reading analysis is performed on an alphanumeric identifier. As another example, the predetermined portions may be predetermined portions where a bar code, identification characters, or other identifier of the physical hard copy document is most likely to be imprinted on the surface of the physical hard copy document.

The predefined portions may be specific to the category of document in which the physical hard copy document may be classified. That is, the user of the client 110 may specify during the scanning-in process a classification for the physical hard copy document and this classification may be encoded in the resulting data (electronic file), such as metadata or header information, for example. This classification data may be transmitted to the server 104 along with the document data. The server 104 may utilize this classification data to lookup, in a predetermined portions data structure, which predetermined portions of the document data to analyze and/or how to analyze them, e.g., what algorithm to apply, to generate the digital fingerprint for the electronic form of the document. For example, the lookup operation, based on the category identifier of the physical hard copy document, may identify an upper right hand corner portion of the physical hard copy document to analyze as well as a bar code reading analysis algorithm to apply to the corresponding data of that particular portion in order to generate the digital fingerprint. For a different category of document, the portion and/or analysis methodology (e.g., algorithm) may be different. The resulting digital fingerprint may be simply an identifier generated as a result of the analysis on the predetermined portion(s) of the physical hard copy document, a digital representation of the properties of the electronic form of the document at the predetermined portions of the document data, e.g., brightness, contrast, color, resolution, size, etc., or any other resulting unique identifier for the physical hard copy document. The digital representation of the properties may further be used to determine a quality of the electronic form of the document for later use in determining which version of the document to store, as discussed hereafter.

Once generated, the digital fingerprint for the electronic form of the document is compared against digital fingerprints of already stored electronic forms of documents. That is, the server 104 may store digital fingerprints for previously stored electronic forms of documents in a digital fingerprint database and may use these digital fingerprints to determine if there a matching digital fingerprint for a previously stored electronic form of a document, within a given tolerance. The digital fingerprint database may be separated into separate databases based on categories of documents so as to reduce the size of candidates that need to be searched to determine if there is a match. The digital fingerprint matching may be performed with regard to the same category of documents and then may be expanded to additional categories of documents as necessary.

In comparing the digital fingerprint of the document to digital fingerprints of previously stored documents, a score of the degree of matching may be generated by comparing the properties of the predefined portions. In one illustrative embodiment, a subset of the predefined portions may be compared and, if there is a sufficient degree of matching for this subset, i.e. the score for this subset is above a predetermined threshold, then additional predefined portions may be compared to determine an overall score of matching of all of the predefined portions. A predetermined threshold may be established for the degree of matching scores above which the digital fingerprints are considered to be sufficiently matched.

The digital fingerprints are preferably linked to associated electronic forms of documents such that once the matching digital fingerprints are identified through the above comparison, the electronic forms of the documents corresponding to the matching digital fingerprints may be retrieved from one or more storage devices and presented to the user, if necessary, such that the user may select which previously stored electronic form of a document corresponds to the hard copy document the user scanned-in, if any. If only one matching digital fingerprint is identified, it is not necessary to present the previously stored electronic form of a document to the user and the matching previously stored electronic form of a document may be automatically selected as a match.

If there is a matching digital fingerprint for a previously converted document, then a notification may be output to the user via the client device 110, for example, informing the user that a previous version of the document has been stored. The notification may further include a prompt and/or user selectable options through which the user may select to either store the new version of the electronic form of the document or store only a link to the previously stored electronic form of the document in the location to which the user was going to store the new version. The notification may further inform the user of which version of the electronic form of the document is determined to be a better quality electronic form of the document and allow the user to select whether to store the new version in place of the old version of the electronic form of the document or not. If the user selects to store the new version in place of the old version, then the new version is stored over the old version in the storage location of the old version such that previously stored links to the old version still work when utilized. Alternatively, the new version may be stored in the target storage location for the new version with a link to this new version being stored in place of the old version in the storage location of the old version electronic form of the document.

If the user selects to store only a link to the previously stored electronic form of the document rather than the new version, the link is stored in the target location that the user intended to store the new version but points to the storage location for the old version of the previously stored electronic form of the document. In this way, when the user attempts to access the document at the target location, the user is actually accessing a link which then retrieves the previously stored electronic form of the document from the storage location of the previously stored electronic form of the document. If the user selects to continue with the storing of the new version of the electronic form of the document, then the new version electronic form is stored in the target location.

Such comparisons of digital fingerprints of documents may be performed regardless of the target storage location for the documents or the actual storage location of previously converted documents. Thus, duplicative storage of electronic forms of the same physical hard copy document in multiple locations of storage devices or storage systems that are associated with each other may be avoided. The storage of a link to a previously converted document's electronic file rather than a duplicate of the electronic file in the new storage location greatly reduces the amount of storage space that electronic document files consume by eliminating duplicate electronic files.

Figure 3:
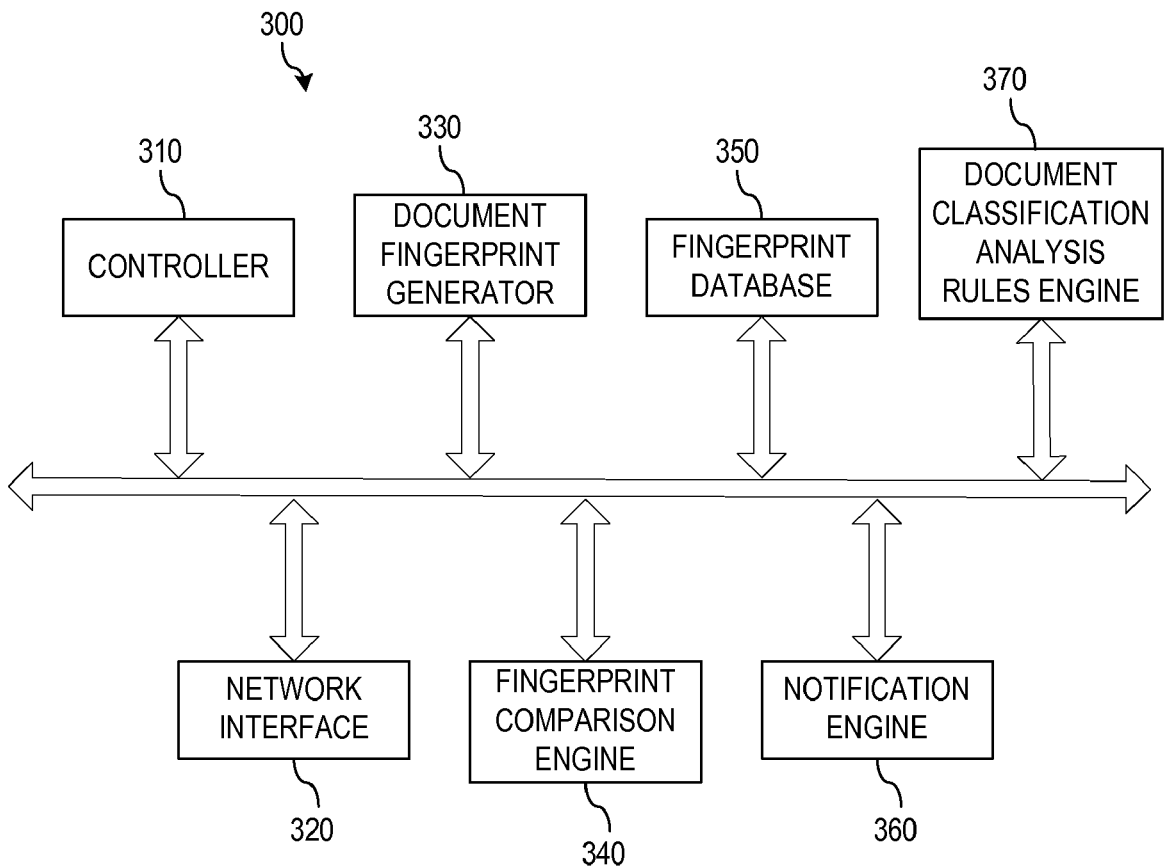
FIG. 3 is an example block diagram illustrating the primary operational components of a duplicate document detection and notification mechanism in accordance with one illustrative embodiment.

FIG. 3 is an example block diagram illustrating the primary operational components of a duplicate document detection and notification mechanism in accordance with one illustrative embodiment. The duplicate document detection and notification mechanism may be implemented in a client computing device, a server computing device, a storage system controller, or the like. In the depicted example, it is assumed that the mechanism 300 is implemented in a server, such as server 104 in FIG. 1, and communicates with one or more client computing devices which submit requests to store electronic forms of physical hard copy documents.

As shown in FIG. 3, the duplicate document detection and notification mechanism 300 includes a controller 310, a network interface 320, a fingerprint generator 330, a fingerprint comparison engine 340, a fingerprint database 350, a notification engine 360, and a document classification analysis rules engine 370. The controller 310 comprises control logic for implementing the mechanisms of the illustrative embodiments and orchestrates the operation of the other elements 320-370. The network interface 320 provides a communication interface through which the duplicate document detection and notification mechanism 300 may receive requests to store an electronic form of a physical hard copy document scanned-in or otherwise converted to an electronic form. The network interface 320 further provides a communication interface through which the duplicate document detection and notification mechanism 300 may send notifications to users via their client computing devices and receive user input indicating the user's selection of how to proceed with the storage of the electronic form of the physical hard copy document.

The controller 310 may receive a request to store an electronic form of a physical hard copy document via the network interface 320 from a client computing device. The request preferably includes the data corresponding to the electronic form of the document as well as any metadata associated with that data. Such metadata may specify a category of the physical hard copy document with which the data in the request corresponds.

The controller 310 provides the data and metadata from the request to the fingerprint generator 330. The fingerprint generator 330 uses the metadata to determine a document classification for the document that is the subject of the request and uses that classification to retrieve corresponding analysis rules from the document classification analysis rules engine 370. Based on the classification of the document, identification of the particular portions of the data received in the request that are to be analyzed, and the manner by which the data is to be analyzed, to generate a digital fingerprint for the document is retrieved from the document classification analysis rules engine 370. The fingerprint generator 330 then applies the information retrieved from the document classification analysis rules engine 370 to the data received in the request to thereby generate a digital fingerprint for the document.

The digital fingerprint, along with the metadata, is provided to the fingerprint comparison engine 340 which retrieves previously stored digital fingerprints of previously stored electronic forms of documents from the fingerprint database 350. The particular digital fingerprints retrieved from the fingerprint database 350 may be those that are classified in the same classification as the document that is the subject of the request, as identified by the metadata. For example, if the document has a classification of "receipt" then digital fingerprints of prior stored electronic forms of documents in the "receipt" class may be retrieved from the database 350. The database 350 may store digital fingerprints for previously stored electronic forms of documents of various classifications, subclassifications, or the like.

The fingerprint comparison engine 340 compares the retrieved fingerprints to the digital fingerprint generated based on the data received in the request. Based on the comparison, the fingerprint comparison engine 340 generates a score representing a degree of matching of each of the retrieved digital fingerprints to the digital fingerprint generated based on the data received in the request. The scores may be compared against one or more predetermined thresholds with scores satisfying predetermined conditions relative to these one or more predetermined thresholds being selected as candidates for matching the electronic form of the document in the request.

Based on results of the comparison and scoring, the notification engine 350 may generate a notification of a corresponding already stored electronic form of the document. Alternatively, if no corresponding already stored electronic form of the document exists, then no notification is necessary. As discussed previously, this notification may include user selectable options for storing the new version of the electronic form of the document, storing a link to the older version, or the like. Based on the user's selection of options and/or other input, the controller 310 then controls the storage of the data in the request or a link in the target location for the data identified in the original request. Moreover, the controller 310 may control updating the older version of the electronic form of the document by either storing over the older version with the new version or storing a link to the new version at the older version's storage location.

Figure 4:
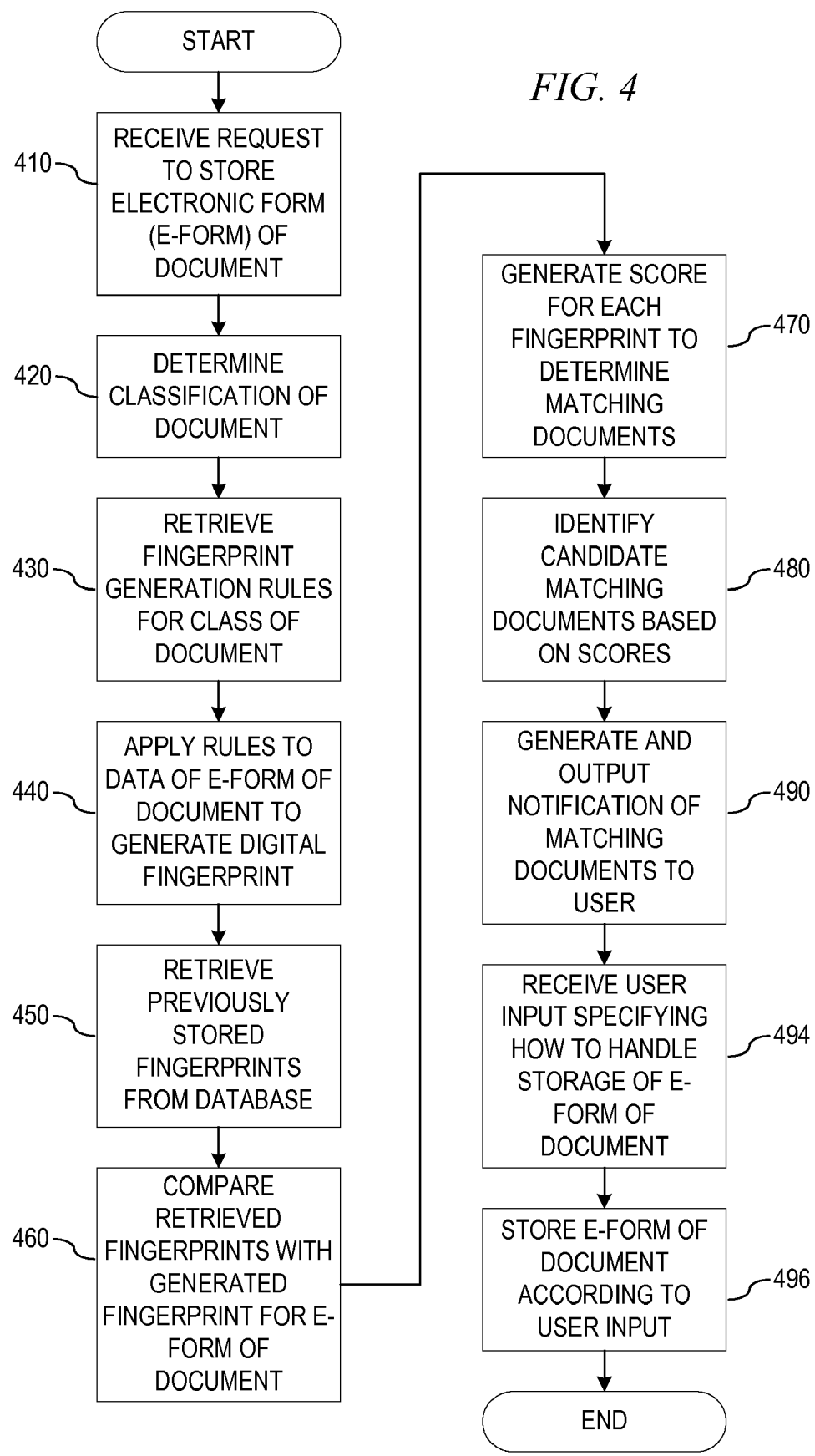
FIG. 4 is a flowchart outlining an example operation for performing duplicate document detection and notification in accordance with one illustrative embodiment.

FIG. 4 is a flowchart outlining an example operation for performing duplicate document detection and notification in accordance with one illustrative embodiment. As shown in FIG. 4, the operation starts with receiving a request to store an electronic form of a physical hard copy document (step 410). A classification of the document that is the subject of the request is determined (step 420) and fingerprint generation analysis rules are retrieved based on the classification (step 430). The fingerprint generation analysis rules are applied to the data of the electronic form of the document received in the request to thereby generate a digital fingerprint of the electronic form of the document (step 440).

The digital fingerprint, along with the classification information, is used to retrieve previously stored digital fingerprints of previously stored electronic forms of documents from a fingerprint database (step 450). A comparison of the retrieved fingerprints to the digital fingerprint generated based on the data received in the request is performed (step 460). Based on the comparison, a score representing a degree of matching of each of the retrieved digital fingerprints to the digital fingerprint generated based on the data received in the request is generated (step 470). Candidates for matching the electronic form of the document in the request are identified based on the scores (step 480). A notification of a corresponding already stored electronic form of the document is generated and output to the user (step 490). User input identifying the user's preference for storing the electronic form of the document is received (step 494) and the electronic form of the document is stored accordingly (step 496). The operation then terminates.

Thus, the illustrative embodiments provide a mechanism, for detecting when duplicate versions an electronic form of the same physical hard copy document are being stored to associated storage devices. The mechanisms of the illustrative embodiments help to conserve storage space in such associated storage devices by reducing instances of duplicate copies of the same document being stored in the same or different storage locations. Moreover, the mechanisms provide notifications to users of such duplication so that the user is aware of the presence of the duplicates. Furthermore, rather than storing duplicate copies of the same document, links may be stored in target storage locations rather than the data for the document, the links pointing to already stored versions of the electronic form of the document.

Figure 5:
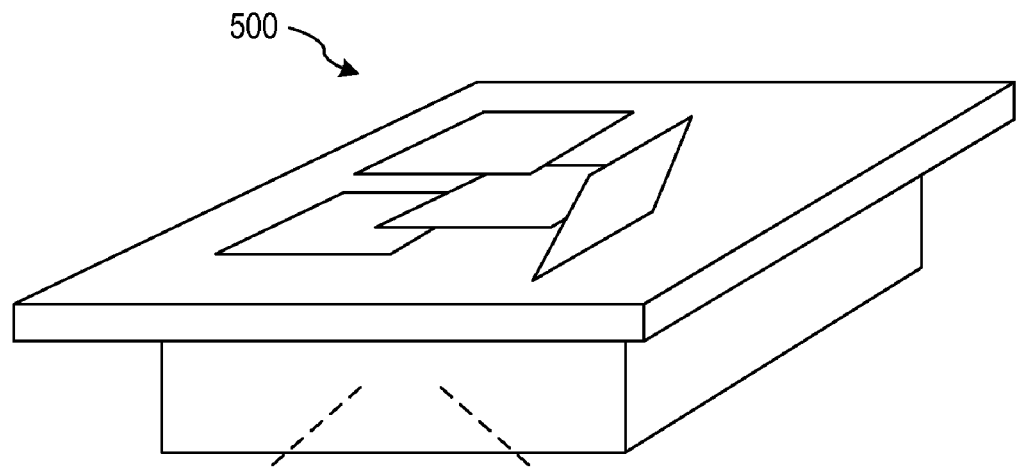
FIG. 5 is an example diagram illustrating one illustrative embodiment in which a digital furniture mechanism is utilized.
Figure 5:
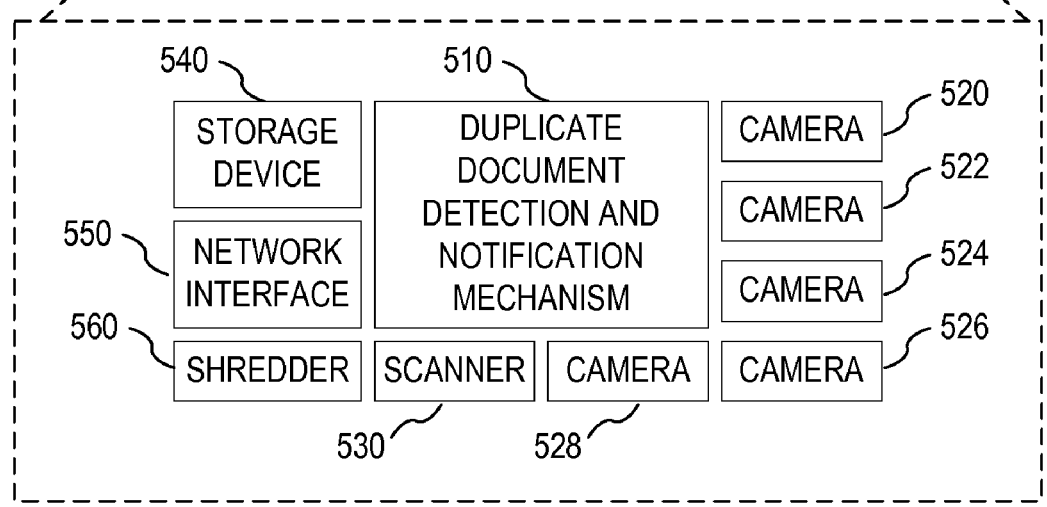

FIG. 5 is an example diagram illustrating one illustrative embodiment in which a digital furniture mechanism is utilized. The digital furniture may take many different forms. In the depicted example, the digital furniture 500 is a digital table. The digital table 500 includes a surface that utilizes the new emerging surface technology such as is provided in Surface™ from Microsoft Corporation, for example. Surface™ is essentially a Windows Vista® PC tucked inside a black table base, topped with a 30-inch touchscreen in a clear acrylic frame. Five cameras that can sense nearby objects are mounted beneath the screen. Users can interact with the machine by touching or dragging their fingertips and objects such as paintbrushes across the screen. In addition to recognizing finger movements, Surface™ may also identify real-world items tagged with special barcode labels. For example, when a diner sets down a wine glass tagged with a special barcode, the Surface™ may automatically offer additional wine choices tailored to the dinner being eaten.

The four main components that are important in the Surface™ interface are direct interaction, multi-touch contact, a multi-user experience, and object recognition via a special barcode. The device also enables drag and drop digital media when wi-fi enabled devices are placed on its surface such as a Microsoft Zune™, cellular phones, or digital cameras. The Surface™ technology allows non-digital objects to be used as input devices. In one example, a normal paint brush was used to create a digital painting in the software. Using cameras for vision makes it possible for Surface™ to not rely on restrictive properties required of conventional touchscreen or touchpad devices such as the capacitance, electrical resistance, or temperature of the tool used. The Surface™ "vision" is created by a near-infrared, 850-nanometer-wavelength LED light source aimed at the surface. When an object touches the tabletop, the light is reflected to multiple infrared cameras with a net resolution of 1280×960, allowing it to sense, and react to items touching the tabletop.

The Surface™ technology may be utilized in the digital furniture 500 and maybe augmented to incorporate the mechanisms of the illustrative embodiments described previously. That is, the digital furniture 500 may include a duplicate document detection and notification mechanism 510 similar to that depicted in FIG. 3 above. The digital cameras 520-528 of the Surface™ technology may be used as the scanning mechanisms for obtaining an electronic form of a physical hard copy document placed on the surface of the digital furniture. Alternatively, a separate scanner 530 may be placed in a specified region of the digital furniture 500 for purposes of using the mechanisms of the illustrative embodiments.

The request to store the electronic form of the document may be generated in response to a user's interaction with the surface of the digital furniture 500 by moving a representation of the electronic form of the document to an appropriate virtual representation of a folder, filing cabinet, drawer or the like, depicted on the surface of the digital furniture 500. The representation of the folder, filing cabinet, drawer, or the like may be associated with a particular classification of documents, a particular target storage location, and/or both.

While the Surface™ technology is limited to reading barcodes off of items placed on the surface, the illustrative embodiments are not limited to such, as described previously. To the contrary, the scanner 530 and/or digital cameras 520-528 generate data representative of the physical hard copy document and provide it to the duplicate document detection and notification mechanism 510 which then determines what portions of data are important to the generation of a digital fingerprint of the document, not just barcodes. The digital furniture 500 may include a storage device 540 for storing the electronic forms of documents placed on the surface of the digital furniture 500 and/or may have a network interface 550 for transmitting these electronic forms to a remote server or storage system.

In addition, the digital furniture 500 may include a shredder mechanism 560 that is integrated with, or otherwise associated with, the digital furniture 500. The controller of the duplicate document detection and notification mechanism 510 may further control the operation of the shredder mechanism 560 such that the shredder mechanism 560 is not permitted to operate until a final determination as to how the electronic form of the document, presently on the surface of the digital furniture 500, is to be stored. Once confirmation of proper storage has been received, either from the local storage device, the remote server, or the remote storage system, then the shredder 560 may be automatically initiated and instructions provided via the surface of the digital furniture 500 instructing the user how to dispose of the physical hard copy document.

Thus, in this example implementation, a user may make use of digital furniture 500 to control the storage of electronic forms of physical hard copy documents. Moreover, the digital furniture 500 further provides a mechanism for destroying the physical hard copy documents and controlling when such destruction can be done. That is, destruction of the physical hard copy document is controlled to only occur when storage of the electronic form of the hard copy document has been performed and confirmed.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for storing an electronic form of a physical hard copy document, comprising:

converting the physical hard copy document to an electronic form of the document;

generating a first digital fingerprint of the electronic form of the document;

retrieving one or more second digital fingerprints for previously stored electronic forms of documents;

comparing the first digital fingerprint to the one or more second digital fingerprints; and controlling storage of the electronic form of the document based on results of comparing the first digital fingerprint to the one or more second digital fingerprints, wherein controlling storage of the electronic form of the document based on results of comparing the first digital fingerprint to the one or more second digital fingerprints comprises:

determining a degree of matching between the first digital fingerprint and each of the one or more second digital fingerprint;

identifying at least one of the one or more second digital fingerprints having a degree of matching that is equal to or greater than a predetermined threshold, the at least one second digital fingerprint being associated with a previously stored electronic document;

presenting an option to a user identifying the electronic form of the document and the previously stored electronic document of the document and requesting an input from the user to control storage of the electronic form of the document;

receiving a user input in response to presenting the option; and controlling storage of the electronic form of the document based on user input in response to presenting the option.

2. The method of claim 1, wherein controlling storage of the electronic form of the document based on results of comparing comprises:

determining whether a same physical hard copy document has been previously stored in an electronic form in a storage location of a storage device associated with the data processing system; and providing a prompt requesting user input to either confirm storage of the electronic form of the document or cancel storage of the electronic form of the document in response to a determination that the same physical hard copy document has been previously stored in an electronic form in a storage location of a storage device associated with the data processing system.

3. The method of claim 1, wherein generating the first digital fingerprint comprises:

analyzing data values, generated during the conversion of the physical hard copy document to the electronic form of the document, corresponding to one or more predetermined portions of the physical hard copy document; and utilizing these data values to generate a digital fingerprint representation of the electronic form of the document.

4. The method of claim 3, wherein the one or more predetermined portions are one or more of a pre-selected portion of the physical hard copy document upon which optical character reading analysis is to be performed on an alphanumeric identifier, a predetermined portion of the physical hard copy document where identification characters are provided, a predetermined portion of the physical hard copy document where a bar code is provided, or a predetermined portion of the physical hard copy document where an identifier of the physical hard copy document is imprinted on the surface of the physical hard copy document.

5. The method of claim 3, wherein the one or more predetermined portions are specific to a category of physical hard copy documents in which the physical hard copy document is classified, and wherein the physical hard copy document is capable of having any of a plurality of different categories of physical hard copy documents, each category of physical hard copy documents having a specific predetermined portion from which a fingerprint for physical hard copy documents classified in that category is to be generated.

6. The method of claim 5, further comprising receiving a category identifier of the category of the physical hard copy document, wherein generating a first digital fingerprint of the electronic form of the document comprises:

performing a lookup operation, in a predetermined portions data structure, of the category identifier to thereby identify at least one of the one or more predetermined portions of the physical hard copy document to analyze, or a manner by which to analyze the one or more predetermined portions, to generate the first digital fingerprint; and generating the first digital fingerprint based on results of the lookup operation.

7. The method of claim 5, wherein retrieving one or more second digital fingerprints for previously stored electronic forms of documents comprises retrieving the one or more second digital fingerprints from a database corresponding to the category of physical hard copy documents corresponding to the physical hard copy document converted to the electronic form of the document.

8. The method of claim 1, wherein the user input specifies at least one of storing the electronic form of the document, storing a link to the previously stored electronic document in a target storage location to which the electronic form of the document was going to be stored, or storing the electronic form of the document in the target storage location and replacing the previously stored electronic document with a link to the target storage location.

9. The method of claim 1, wherein the data processing system is a digital furniture device.

10. A computer program product comprising a non-transitory computer readable medium having a computer readable program stored thereon, wherein the computer readable program, when executed on a computing device, causes the computing device to:

convert a physical hard copy document to an electronic form of the document;

generate a first digital fingerprint of the electronic form of the document;

retrieve one or more second digital fingerprints for previously stored electronic forms of documents;

compare the first digital fingerprint to the one or more second digital fingerprints; and control storage of the electronic form of the document based on results of comparing the first digital fingerprint to the one or more second digital fingerprints, wherein the computer readable program causes the computing device to control storage of the electronic form of the document based on results of comparing the first digital fingerprint to the one or more second digital fingerprints by:

determining a degree of matching between the first digital fingerprint and each of the one or more second digital fingerprint;

identifying at least one of the one or more second digital fingerprints having a degree of matching that is equal to or greater than a predetermined threshold, the at least one second digital fingerprint being associated with a previously stored electronic document;

presenting an option to a user identifying the electronic form of the document and the previously stored electronic document of the document and requesting an input from the user to control storage of the electronic form of the document;

receiving a user input in response to presenting the option; and controlling storage of the electronic form of the document based on user input in response to presenting the option.

11. The computer program product of claim 10, wherein the computer readable program causes the computing device to control storage of the electronic form of the document based on results of comparing by determining whether a same physical hard copy document has been previously stored in an electronic form in a storage location of a storage device associated with the computing device, and providing a prompt requesting user input to either confirm storage of the electronic form of the document or cancel storage of the electronic form of the document in response to a determination that the same physical hard copy document has been previously stored in an electronic form in a storage location of a storage device associated with the data processing system.

12. The computer program product of claim 10, wherein the computer readable program causes the computing device to generate the first digital fingerprint by:

analyzing data values, generated during the conversion of the physical hard copy document to the electronic form of the document, corresponding to one or more predetermined portions of the physical hard copy document; and utilizing these data values to generate a digital fingerprint representation of the electronic form of the document.

13. The computer program product of claim 12, wherein the one or more predetermined portions are one or more of a pre-selected portion of the physical hard copy document upon which optical character reading analysis is to be performed on an alphanumeric identifier, a predetermined portion of the physical hard copy document where identification characters are provided, a predetermined portion of the physical hard copy document where a bar code is provided, or a predetermined portion of the physical hard copy document where an identifier of the physical hard copy document is imprinted on the surface of the physical hard copy document.

14. The computer program product of claim 12, wherein the one or more predetermined portions are specific to a category of physical hard copy documents in which the physical hard copy document is classified, and wherein the physical hard copy document is capable of having any of a plurality of different categories of physical hard copy documents, each category of physical hard copy documents having a specific predetermined portion from which a fingerprint for physical hard copy documents classified in that category is to be generated.

15. The computer program product of claim 14, wherein the computer readable program further causes the computing device to receive a category identifier of the category of the physical hard copy document, and wherein the computer readable program causes the computing device to generate a first digital fingerprint of the electronic form of the document by:

performing a lookup operation, in a predetermined portions data structure, of the category identifier to thereby identify at least one of the one or more predetermined portions of the physical hard copy document to analyze, or a manner by which to analyze the one or more predetermined portions, to generate the first digital fingerprint; and generating the first digital fingerprint based on results of the lookup operation.

16. The computer program product of claim 14, wherein the computer readable program causes the computing device to retrieve one or more second digital fingerprints for previously stored electronic forms of documents by retrieving the one or more second digital fingerprints from a database corresponding to the category of physical hard copy documents corresponding to the physical hard copy document converted to the electronic form of the document.

17. The computer program product of claim 10, wherein the user input specifies at least one of storing the electronic form of the document, storing a link to the previously stored electronic document in a target storage location to which the electronic form of the document was going to be stored, or storing the electronic form of the document in the target storage location and replacing the previously stored electronic document with a link to the target storage location.

18. An apparatus, comprising:

a processor; and a memory coupled to the processor, wherein the memory comprises instructions which, when executed by the processor, cause the processor to:

convert a physical hard copy document to an electronic form of the document;

generate a first digital fingerprint of the electronic form of the document;

retrieve one or more second digital fingerprints for previously stored electronic forms of documents;

compare the first digital fingerprint to the one or more second digital fingerprints; and control storage of the electronic form of the document based on results of comparing the first digital fingerprint to the one or more second digital fingerprints, wherein the instructions cause the processor to control storage of the electronic form of the document based on results of comparing the first digital fingerprint to the one or more second digital fingerprints by:

determining a degree of matching between the first digital fingerprint and each of the one or more second digital fingerprint;

identifying at least one of the one or more second digital fingerprints having a degree of matching that is equal to or greater than a predetermined threshold, the at least one second digital fingerprint being associated with a previously stored electronic document;

presenting an option to a user identifying the electronic form of the document and the previously stored electronic document of the document and requesting an input from the user to control storage of the electronic form of the document;

receiving a user input in response to presenting the option; and controlling storage of the electronic form of the document based on user input in response to presenting the option.

* * * * *